US012811908B2

(12) United States Patent
Hsiao et al.

(10) Patent No.: US 12,811,908 B2
(45) Date of Patent: Nov. 24, 2026

(54) ALWAYS-ON ARTIFICIAL INTELLIGENCE (AI) SECURITY

(71) Applicant: MEDIATEK INC., Hsinchu (TW)

(72) Inventors: Chih-Hsiang Hsiao, Hsinchu (TW); Sushih Yong, Hsinchu (TW); Hsu Chia-Feng, Hsinchu (TW); Yenyu Lu, Hsinchu (TW)

(73) Assignee: MEDIATEK INC., Hsinchu City (TW)

( * ) Notice: Subject to any disclaimer, the term of this patent is extended or adjusted under 35 U.S.C. 154(b) by 401 days.

(21) Appl. No.: 18/296,661

(22) Filed: Apr. 6, 2023

(65) Prior Publication Data

US 2023/0328031 A1 Oct. 12, 2023

Related U.S. Application Data

(60) Provisional application No. 63/331,400, filed on Apr. 15, 2022, provisional application No. 63/327,902, filed on Apr. 6, 2022.

(51) Int. Cl.
*H04L 29/06* (2006.01)
*H04L 9/40* (2022.01)

(52) U.S. Cl.
CPC .................................. *H04L 63/02* (2013.01)

(58) Field of Classification Search
CPC ..... H04L 63/02; H04L 9/3247; H04L 9/0825; H04L 9/0852; H04L 9/0891
See application file for complete search history.

(56) References Cited

U.S. PATENT DOCUMENTS

| | | | | |
|---|---|---|---|---|
| 10,540,509 | B2 | 1/2020 | Ashkenazi | |
| 10,762,198 | B1 | 9/2020 | Dea | |
| 2016/0134660 | A1 * | 5/2016 | Ponsini | H04L 63/20 726/1 |
| 2019/0188386 | A1 | 6/2019 | Pogorelik et al. | |
| 2021/0110009 | A1 | 4/2021 | Liu et al. | |

(Continued)

FOREIGN PATENT DOCUMENTS

TW 201826162 A 7/2018

OTHER PUBLICATIONS

Extended European Search Report issued Aug. 30, 2023, in corresponding European Patent Application No. 23166924.3, 5 pages.

*Primary Examiner* — Wasika Nipa
(74) *Attorney, Agent, or Firm* — Winston Hsu

(57) ABSTRACT

Aspects of the present disclosure provide an apparatus, which can include a first secured processor and secured applications embedded in the first secured processor. Each of the secured applications can be associated with an artificial intelligence (AI) model. The apparatus can further include first secured memories each configured to store an AI executable binary associated with a corresponding one of the AI models, a second secured processor configured to execute the AI executable binaries stored in the first secured memories, a sub-system, and an AI session manager configured to receive from the sub-system an AI session that identifies one of the AI models, and prepare and store an AI executable binary associated with the AI model to one of the first secured memories that corresponds to the AI executable binary. The sub-system can trigger the second secured processor to execute the AI executable binary stored in the first secured memory.

10 Claims, 6 Drawing Sheets

(56) References Cited

U.S. PATENT DOCUMENTS

| | | | | |
|---|---|---|---|---|
| 2021/0165883 | A1* | 6/2021 | Zhang | G06F 9/4411 |
| 2021/0232681 | A1 | 7/2021 | Tsirkin | |
| 2022/0269796 | A1* | 8/2022 | Chase | G06F 21/577 |
| 2022/0321332 | A1* | 10/2022 | Linton | H04L 9/0852 |
| 2023/0097169 | A1* | 3/2023 | Dwivedi | G06F 18/29 706/15 |

* cited by examiner

ALWAYS-ON ARTIFICIAL INTELLIGENCE (AI) SECURITY

CROSS-REFERENCE TO RELATED APPLICATIONS

The present disclosure claims the benefit of U.S. provisional application No. 63/327,902, filed on Apr. 6, 2022, and the benefit of U.S. provisional No. 63/331,400, filed on Apr. 15, 2022, which are incorporated herein for reference in their entirety.

TECHNICAL FIELD

The present disclosure relates to neural networks (NNs), and, more specifically, to always-on artificial intelligence (AI) security.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Ambient intelligence (AmI), e.g., ambient sensing, is proposed aiming to enhance the way environments and people interact with each other. Specifically speaking, AmI indicates intelligent computing where explicit input and output devices will not be required; instead a variety of sensors, e.g., accelerometers, global positioning system (GPS), microphone, camera, etc., and processors can be embedded into everyday electronic devices, e.g., mobile phones, to collect and process contextual information, using artificial intelligence (AI) techniques, for example, in order to interpret the environment's state and the users' needs.

SUMMARY

Aspects of the present disclosure provide an apparatus that can be ambient intelligence (AmI) enabled. For example, the apparatus can include a first secured processor and two and more secured applications embedded in the first secured processor. Each of the secured applications can be associated with an artificial intelligence (AI) model. The apparatus can further include two and more first secured memories coupled to the first secured processor. Each of the first secured memories can be configured to store an AI executable binary that is associated with a corresponding one of the AI models. The apparatus can further include a second secured processor coupled to the first secured memories. The second secured processor can be configured to execute the AI executable binaries stored in the first secured memories. The apparatus can further include a sub-system coupled to the second secured processor, and an AI session manager coupled to the sub-system and the secured applications, the AI session manager configured to receive from the sub-system an AI session that identifies one of the AI models, and prepare and store an AI executable binary associated with the AI model to one of the first secured memories that corresponds to the AI executable binary. The sub-system can trigger the second secured processor to execute the AI executable binary stored in the first secured memory.

In an embodiment, the apparatus can further include a secure operating system (OS) embedded in the first secured processor. The secure OS can be configured to provide a trusted execution environment (TEE) within which the secured applications are protected. For example, the AI session manager can be embedded in the first secured processor and protected within the TEE. In another embodiment, the first secured memories and the second secured processor can be protected by a first firewall. In some embodiments, the sub-system can be protected by a second firewall. For example, the first firewall can provide a higher security level than the second firewall.

In an embodiment, the apparatus can further include a second memory coupled to the second secured processor. The second memory can be configured to store data on which the second secured processor executes the AI executable binary. In another embodiment, the apparatus can further include an image signal processor (ISP) coupled to the second memory. The ISP can be configured to process images and store the processed images into the second memory. In some embodiments, the apparatus can further include a facial biometric pattern secured within the TEE. For example, the second secured processor can execute the AI executable binary to determine whether any one of the processed images matches the facial biometric pattern.

In an embodiment, the first secured memories and the second secured processor can be protected by a first firewall. In another embodiment, the AI session manager can be embedded in the second secured processor. In some embodiments, the AI session manager can be protected by the first firewall. In various embodiments, the sub-system can be protected by a second firewall. For example, the first firewall can provide a higher security level than the second firewall.

In an embodiment, the sub-system can include a sensor hub.

In an embodiment, the first secured processor can include a secured central processing unit (CPU).

In an embodiment, the second secured processor can include a secured deep learning accelerator (DLA). In another embodiment, the DLA can include an accelerated processing unit (APU).

Note that this summary section does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the present disclosure and embodiments, the reader is directed to the Detailed Description section and corresponding figures of the present disclosure as further discussed below.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Ambient intelligence (AmI), e.g., ambient sensing, is proposed aiming to enhance the way environments and people interact with each other. Specifically speaking, AmI indicates intelligent computing where explicit input and output devices will not be required; instead a variety of sensors, e.g., accelerometers, global positioning system (GPS), microphone, camera, etc., and processors can be embedded into everyday electronic devices, e.g., mobile phones, to collect and process contextual information, using artificial intelligence (AI) techniques, for example, in order to interpret the environment's state and the users' needs.

For example, "Personal Safety" app launched by Google has a feature that can sense if you have been in a car crash and, if so, make an emergency call on your behalf. As another example, AI and machine learning (ML) algorithms (or models) installed in a camera can be capable of recognizing its owner's face, e.g., by determining whether an image captured by the camera matches the facial biometric pattern of the owner's face.

In order for the car crash sensing feature to actually be useful, the mobile phone needs to be able to detect car crashes at all times. For example, whether a car crash happens or not can be determined by continuously polling the accelerometer and the microphone and then processing the data collected thereby, e.g., by performing always-on artificial intelligence (AI). However, the always-on continuous sensing tasks consume a great amount of precious power resources of the mobile phone.

A sensor hub (or a context hub) is a low-power subsystem (e.g., processor) that can be designed to process and interpret the data collected from the sensors, and wake up the main applications processor (AP) to take action. For example, after processing and interpreting the collected data and determining that a car crash has happened, the sensor hub can wake up the AP, and the mobile phone can call for emergency services.

Figure 1:
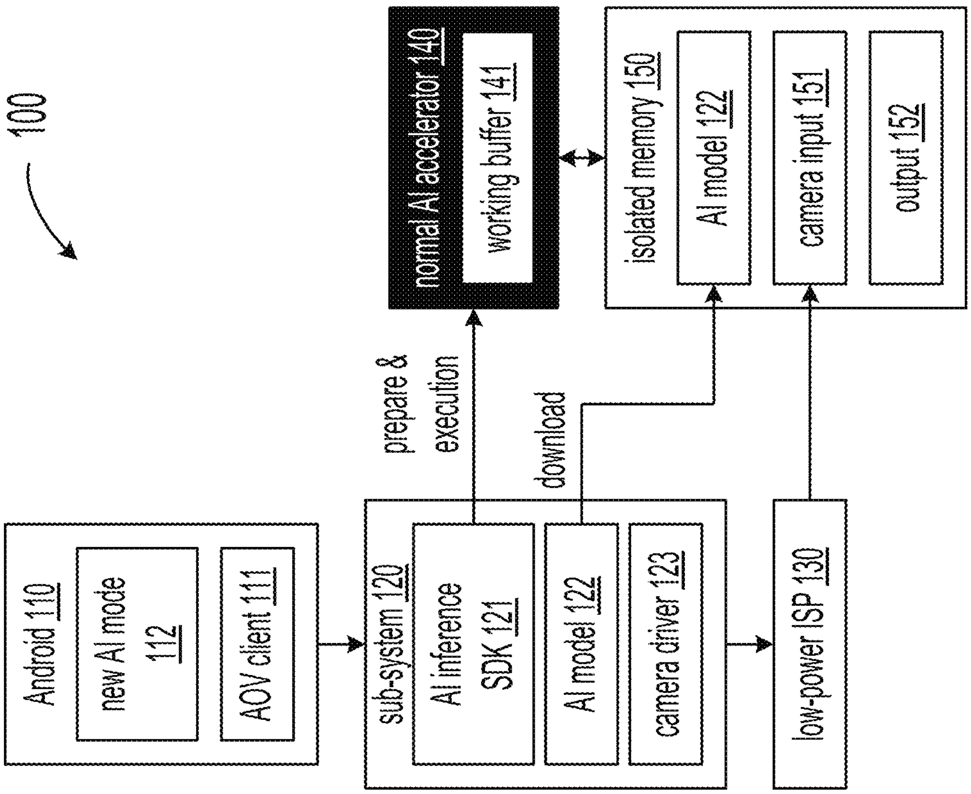
FIG. 1 is a functional block diagram of an ambient intelligence (AmI)-enabled apparatus.

FIG. 1 is a functional block diagram of an AmI-enabled apparatus 100, e.g., a mobile phone. The apparatus 100 can include an AP 110, a low-power sub-system 120 (e.g., a sensor hub) coupled to the AP 110, a signal processor 130 (e.g., a low-power image signal processor (ISP)) coupled to the sensor hub 120, a processor 140 such as an AI accelerator (such as a deep learning accelerator (DLA), e.g., an accelerated processing unit (APU)) coupled to the sensor hub 120, and a memory 150 coupled to the sensor hub 120, the ISP 130 and the APU 140.

The AP 110 can enable an ambient sensing function, e.g., an always-on vision (AOV) client 111, and load an AI model 122 to the sensor hub 120 to offload the vast processing of data collected from embedded sensors, e.g., a camera (not shown) to the sensor hub 120. In the sensor hub 120, a camera driver 123 can drive, based on the AOV client 111, the ISP 130 to process images (e.g., a user's face) captured by the camera and send the processed images to a camera input 151 of the memory 150. A software development kit (SDK) 121, e.g., an AI inference SDK, can drive the APU 140 to execute the AI model 122 on the processed images. For example, the APU 140 can execute the AI model 122 on the processed imaged transmitted from the camera input 151 with the AI executable binary corresponding to the AI model 122 and generate an output 152, e.g., a classification result, that is associated with whether the captured user's face matches the facial biometric pattern of the owner's face.

In the apparatus 100, the sensor hub 120 can provide secured computing with limited flexibility. For example, the sensor hub 120 can be secured at securing booting stage and fixed functions and security when the mobile phone is running. Ambient sensing keeps on sensing data, which include user privacy, such as voice, vision, around, location, etc. This kind of data, and the AI model 122 loaded into the sensor hub 122 as well, are likely to be attacked, stolen or tampered with if they are not well protected. Besides, the processed images on which the APU 140 executes the AI model 122 may be not captured from the camera, but transmitted by attackers from outside.

A firewall is a network security device that can monitor all incoming and outgoing traffic, and accept, reject or drop the traffic based on a defined set of security rules. For example, a firewall can control network access by monitoring incoming and outgoing packets on any open systems interconnection (OSI) layer, up to the application layer, and allowing them to pass or stop based on source and destination IP address, protocols, ports, and the packets' history in a state table, to protect the packets from being attacked, stolen or tampered with. A firewall can be hardware-based or software-based.

Figure 2:
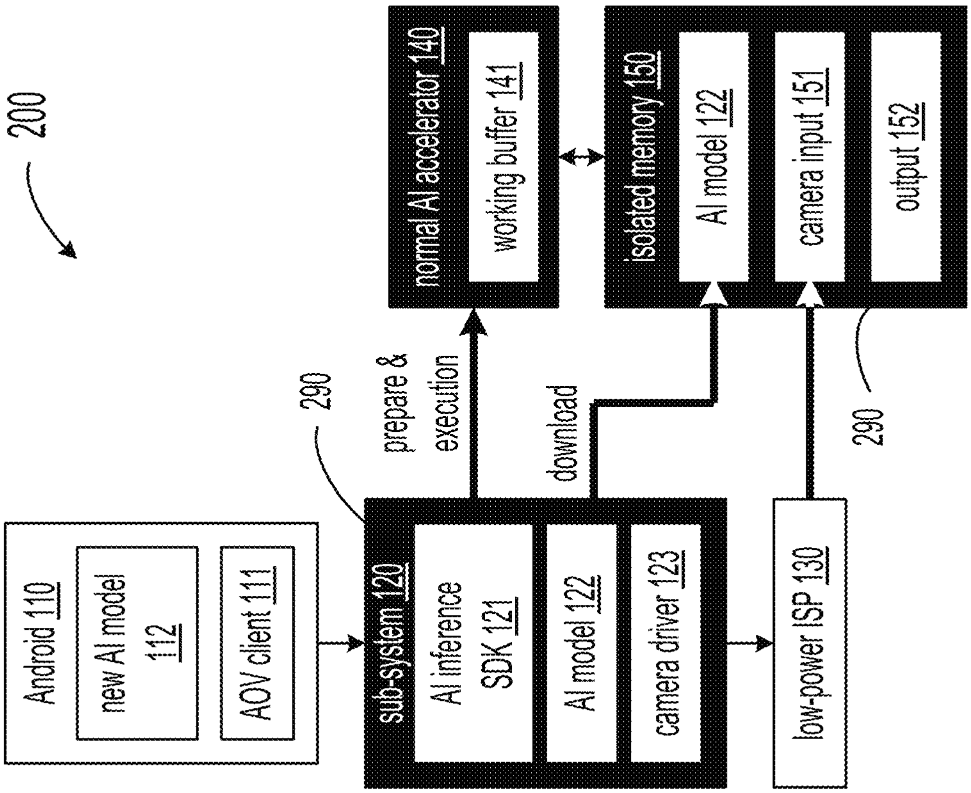
FIG. 2 is a functional block diagram of another ambient intelligence (AmI)-enabled apparatus.

FIG. 2 is a functional block diagram of an AmI-enabled apparatus 200, e.g., a mobile phone. The apparatus 200 differs from the apparatus 100 in that in the apparatus 200 the sensor hub 120 and the memory 150 are well protected, e.g., via a firewall 290 (shown in black background). Therefore, the sensed data and the AI model 122 are secured, and attackers cannot transmit images into the memory 150. However, the AI model 122 needs to be restored or updated (e.g., with a new AI model 112) from time to time for continuously enhancing the performance or security from device training or Internet. The AP 110 cannot restore or update the AI model 122 stored in the sensor hub 120, as the sensor hub 120 is protected by the firewall 290 and the AP 110 does not have the authority to access the sensor hub 120.

Figure 3:
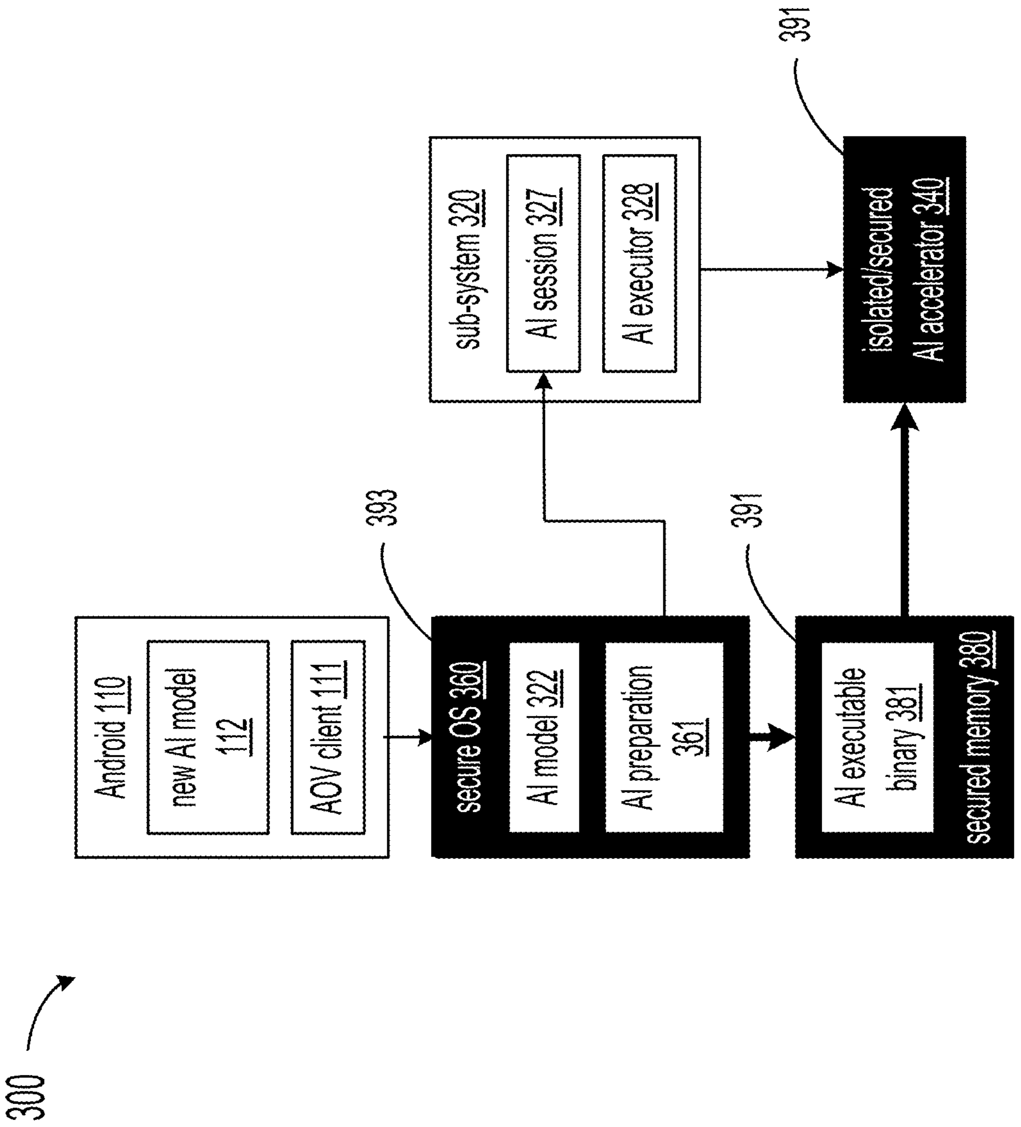
FIG. 3 is a functional block diagram of a first AmI-enabled apparatus according to some embodiments of the present disclosure.

FIG. 3 is a functional block diagram of an AmI-enabled apparatus 300, e.g., a mobile phone, according to some embodiments of the present disclosure. The apparatus 300 can include a secure operating system (OS) 360, which can provide a trusted execution environment (TEE) 393 (shown in black background) for Android, where codes and data, e.g., trusted applications (TA), can be protected with respect to confidentiality and integrity. The secure OS 360 can run on the same processor as to where Android runs, e.g., the AP 110, but be isolated by both hardware and software from the rest of the system, which runs a rich OS within a rich execution environment (REE).

An AI model 322 can be loaded within the TEE 393 provided by the secure OS 360, and AI executable binary 381 and a control flow (including an AI session 327 such as the identifier (ID) of the AI model 322, and an AI executor 328) for the AI model 322 (collectively referred to as AI preparation 361) can be prepared. The AI executable binary 381 can be transmitted to a secured memory 380, and the AI session 327 and the AI executor 328 can be transmitted to a low-power sub-system 320, e.g., a sensor hub. A processor 340 such as an AI accelerator (such as a DLA, e.g., an APU) can execute the AI executable binary 381 by determining the AI session 327 and the AI executor 328. In an embodiment, the memory 380 and the APU 340 are also secured (shown in black background), e.g., via a first firewall 391, in order to protect the AI executable binary 381 from being attacked, stolen or tampered with. In the example embodiment shown in FIG. 3, the sensor hub 320 is not protected, as it provides only the control flow for the AI model 322, which does not involve any sensed data. In some embodiment, the sensor hub 320 can also be protected, e.g., via a firewall. For example, the firewall may provide a lower security level than the first firewall 391, as the AI session 327 and the AI executor 328 are less important than the AI executable binary 381.

Figure 4:
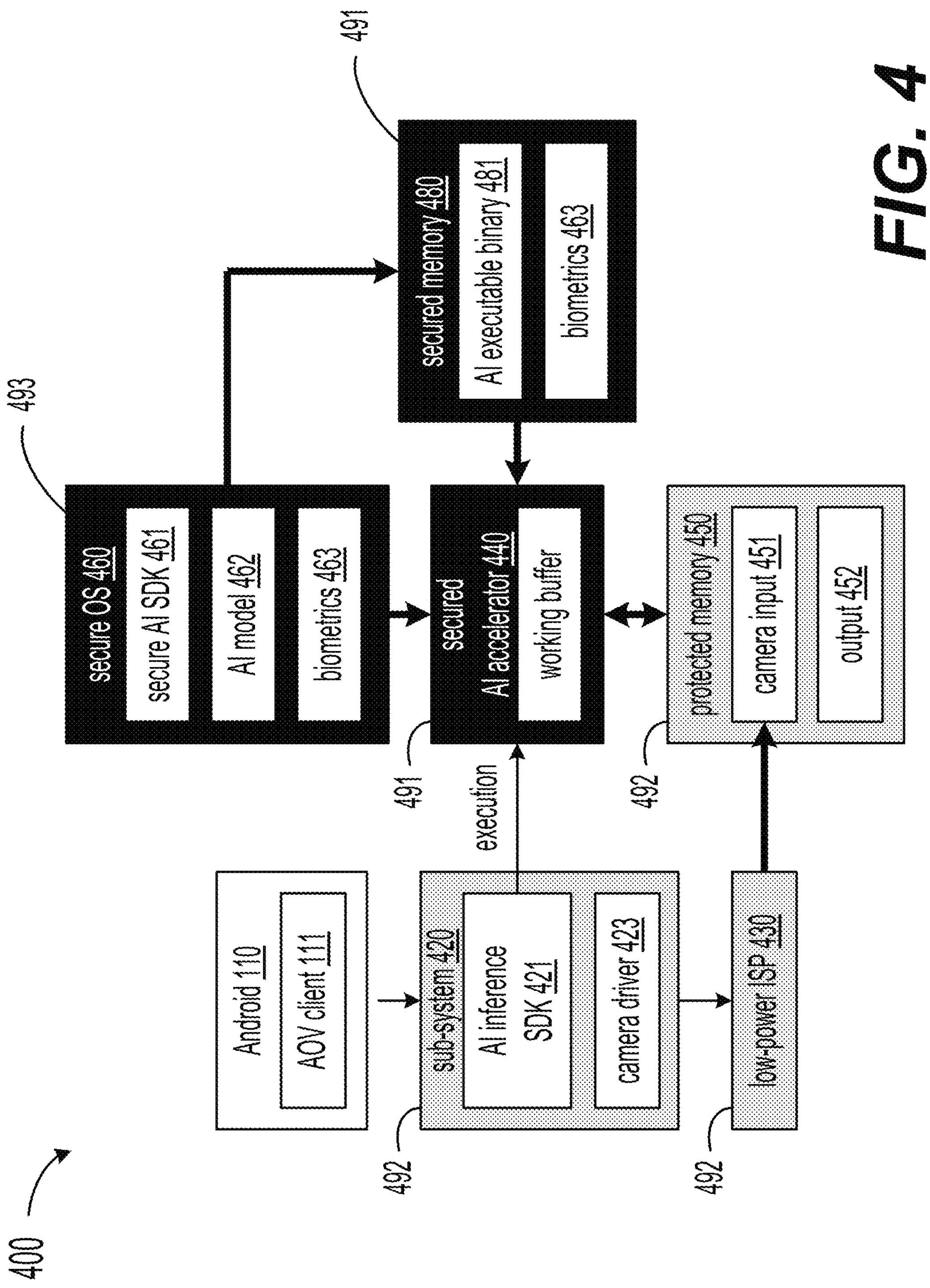
FIG. 4 is a functional block diagram of a second AmI-enabled apparatus according to some embodiments of the present disclosure.

FIG. 4 is a functional block diagram of an AmI-enabled apparatus 400, e.g., a mobile phone, according to some embodiments of the present disclosure. The apparatus 400 can include a secure OS 460, which can provide a TEE 493 (shown in black background) for Android. An AI model 462 can be loaded within the TEE 493 provided by the secure OS 460. Data, e.g., a facial biometric pattern 463, can also be secured within the TEE 493. AI executable binary 481 can be prepared based on the AI model 462 and downloaded into a secured memory 480. The facial biometric pattern 463 can also be downloaded and stored in the secured memory 480.

The apparatus 400 can further include a low-power sub-system 420, e.g., a sensor hub. In the sensor hub 420, a camera driver 423 can drive, based on the AOV client 111, a signal processor 430, e.g., a low-power ISP, to process images (e.g., a user's face) captured by a camera (not shown) and send the processed images to a camera input 451 of a protected memory 450. An SDK 421, e.g., an AI inference SDK, can drive a processor such as an AI accelerator (such as a DLA 440, e.g., an APU) to execute the AI model 462 on the processed images. For example, the APU 440 can execute the AI model 462 on the processed imaged transmitted from the camera input 451 with the AI executable binary 481 and generate an output 452, e.g., a classification result, that is associated with whether the captured user's face matches the owner's face, i.e., the facial biometric pattern 463.

In an embodiment, the secured memory 480 and the APU 440 are well protected, e.g., via a first firewall 491 (shown in black background), in order to protect the AI executable binary 481 and the facial biometric pattern 463 from being damaged, stolen and tampered with. In another embodiment, the sensor hub 420, the protected memory 450 and the ISP 430 can also be protected, e.g., by a second firewall 492 (shown in grey background), in order to prevent attackers from loading images into the ISP 430 and the protected memory 450. For example, the first firewall 491 may provide a higher security level than the second firewall 492, as the facial biometric pattern 463 and the AI executable binary 481 are more important than the captured images that the APU 440 is going to recognize.

In the example embodiment of the apparatus 400, the AI model 462 can be prepared by the TEE 493 provided by the secure OS 460 and protected for only the APU 440 to access. In an embodiment, sensitive data, e.g., the facial biometric pattern 463, can also be protected for only the APU 440 to access.

Figure 5:
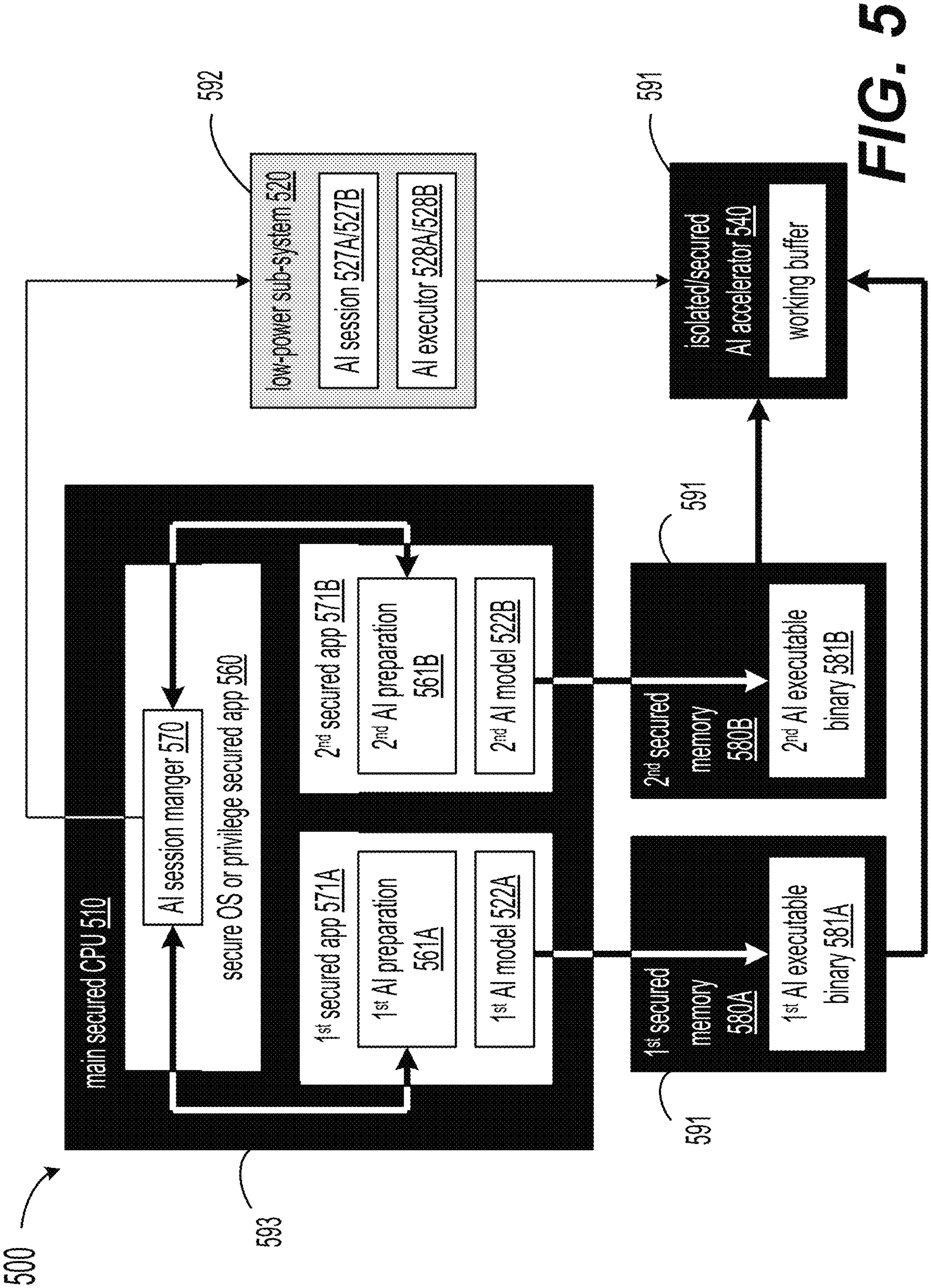
FIG. 5 is a functional block diagram of a third AmI-enabled apparatus according to some embodiments of the present disclosure.

FIG. 5 is a functional block diagram of an AmI-enabled apparatus 500, e.g., a mobile phone, according to some embodiments of the present disclosure. The apparatus 500 can include an AP 510, e.g., a main secured central processing unit (CPU) 510. A secure OS (or privilege secured app) 560 can be embedded in the main secured CPU 510 to provide a TEE 593 (shown in black background).

In an embodiment, two or more secured apps can be secured within the TEE 593, and each of them can be associated with an AI model and AI preparation. For example, a first secured app 571A can be associated with a first AI model 522A and a first AI preparation 561A that is prepared by the secure OS 560 based on the first AI model 522A. As another example, a second secured app 571B can be associated with a second AI model 522B and a second AI preparation 561B that is prepared by the secure OS 560 based on the second AI model 522B. In an embodiment, the first secured app 571A and the second secured app 571B can request the secure OS 560 to open specified files with specified access rights. For example, the secure OS 560 can allow this request, and then open the files and return a handle (e.g., file descriptor, index into a file descriptor table) to the first secured app 571A and the second secured app 571B. Therefore, the first secured app 571A and the second secured app 571B can use the handle as a token to access the secure OS 560.

In an embodiment, a first AI executable binary 581A that is generated based on the first AI preparation 561A can be sent to a first secured memory 580A, and a second AI executable binary 581B that is generated based on the second AI preparation 561B can be sent to a second secured memory 580B. The first and second AI executable binary 581A and 581B can be executed by a DLA, e.g., an APU. In an embodiment, the first secured memory 580A and the second secured memory 580B can be included in a single memory. In another embodiment, the first secured memory 580A and the second secured memory 580B can be separated from each other. In an embodiment, the first secured memory 580A and the second secured memory 580B can be secured, e.g., via a first firewall 591 (shown in black background), in order to protect the first AI executable binary 581A and the second AI executable binary 581B from being attacked, stolen or tampered with.

In an embodiment, the apparatus 500 can further include an AI session manager 570 and a low-power sub-system 520, e.g., a sensor hub. The sensor hub 520 can select and send one or more of a plurality of AI sessions, e.g., a first AI session 527A and a second AI session 527B, to the AI session manager 570. The AI session manager 570, upon reception of the selected AI session, can manage the generation of an AI executable binary based on an AI preparation that is associated with the AI session. For example, the sensor hub 520 can select and send the first AI session 527A to the AI session manager 570, and the AI session manager 570, upon reception of the first AI session 527A, can manage the generation of the first AI executable binary 581A based on the first AI preparation 561A, which is associated with the first AI session 527A, send the generated first AI executable binary 581A to the sensor hub 520, and inform the sensor hub 520 that the first AI executable binary 581A is ready for a processor such as an AI accelerator (such as a DLA, e.g., an APU 540) to execute.

In the example embodiment of the apparatus 500 shown in FIG. 5, the AI session manager 570 can also be secured within the TEE 593 provided by the secure OS 560. In an embodiment, the sensor hub 520 can also be protected, e.g., by a second firewall 592 (shown in grey background). For example, the second firewall 592 may provide a lower security level than the first firewall 591, as the control flow (including the first and second AI sessions 527A and 527B, such as IDs of the first and second AI models 522A and 522B, and first and second AI executors 528A and 528B) is less important than the first AI executable binary 581A and the second AI executable binary 581B.

In an embodiment, the apparatus 500 can further include an isolated or secured DLA 540, e.g., an APU, which can execute one of the first and second AI models 522A and 522B with a corresponding one of the first and second AI executable binary 581A and 582A. For example, the first or second AI executor 528A or 528B can trigger the APU 540 to execute the first or second AI executable binary 581A or 581B that corresponds to the first or second AI session 517A or 527B, respectively. In an embodiment, the APU 540 can also be secured, e.g., via a firewall, such as the first firewall 591.

In the example embodiment of the apparatus 500, the first and second AI models 522A and 522B can be protected by the TEE 593. In an embodiment, sensitive data, e.g., the facial biometric pattern 463, can also be secured within the TEE 593 and downloaded and stored in the first secured memory 580A and/or the second secure memory 580B. In some embodiments, the first and second AI models 522A and 522B, which are protected within the TEE 593, can be updated or restored, and new AI models, e.g., the new AI models 112 shown in FIGS. 1-3, can also be loaded, with mTEE's verification or decryption for security and integrity.

Figure 6:
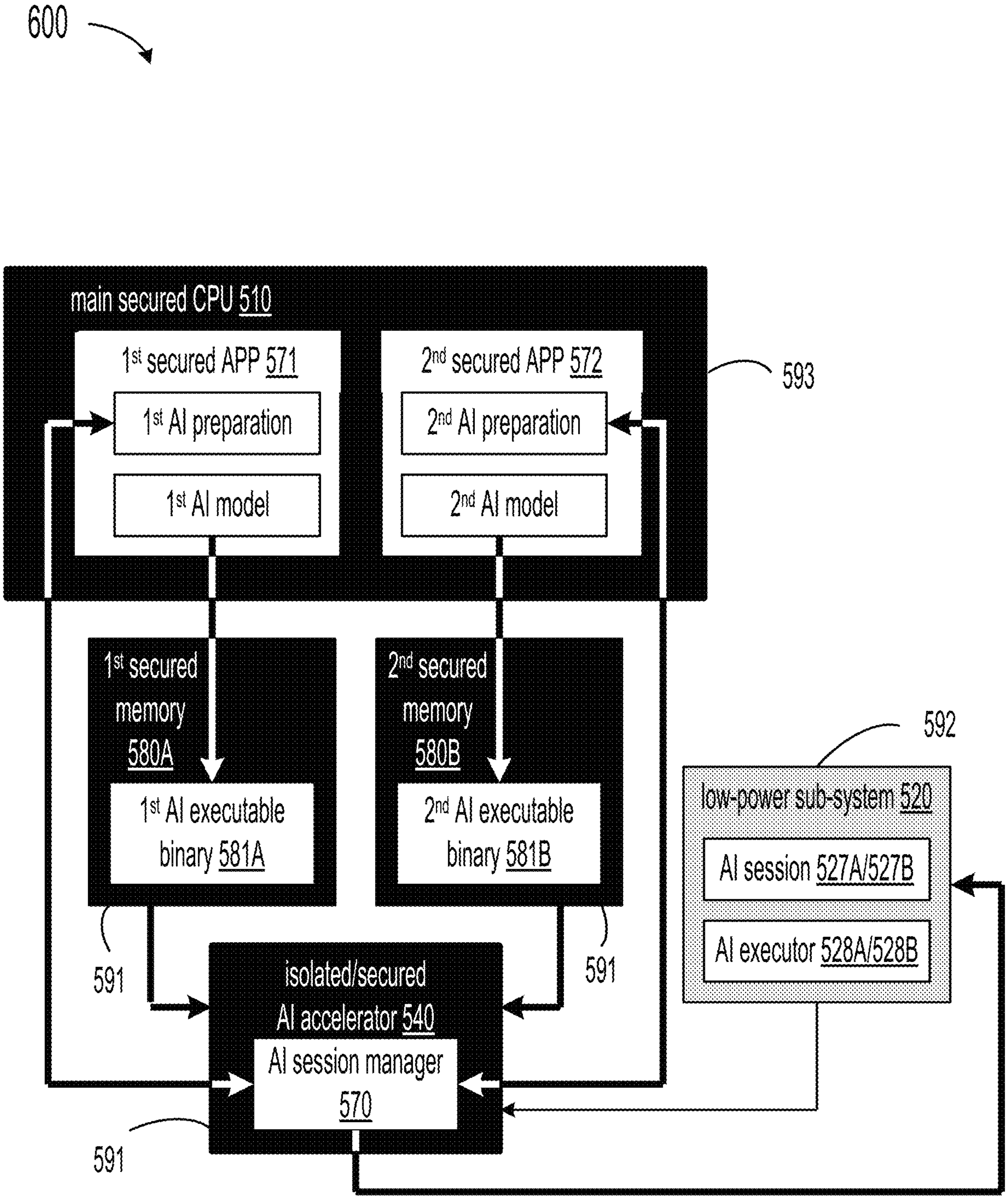
FIG. 6 is a functional block diagram of a fourth AmI-enabled apparatus according to some embodiments of the present disclosure.

FIG. 6 is a functional block diagram of an AmI-enabled apparatus 600, e.g., a mobile phone, according to some embodiments of the present disclosure. The apparatus 600 can be similar to the apparatus 500 except the location of the AI session manager 570 and the omission of the secure OS 560. In the example embodiment of the apparatus 600 shown in FIG. 6, the AI session manager 570 is embedded in the secured APU 540, and the APU 540 can do central management for multiple OSs (hosts) supporting.

Figure 7:
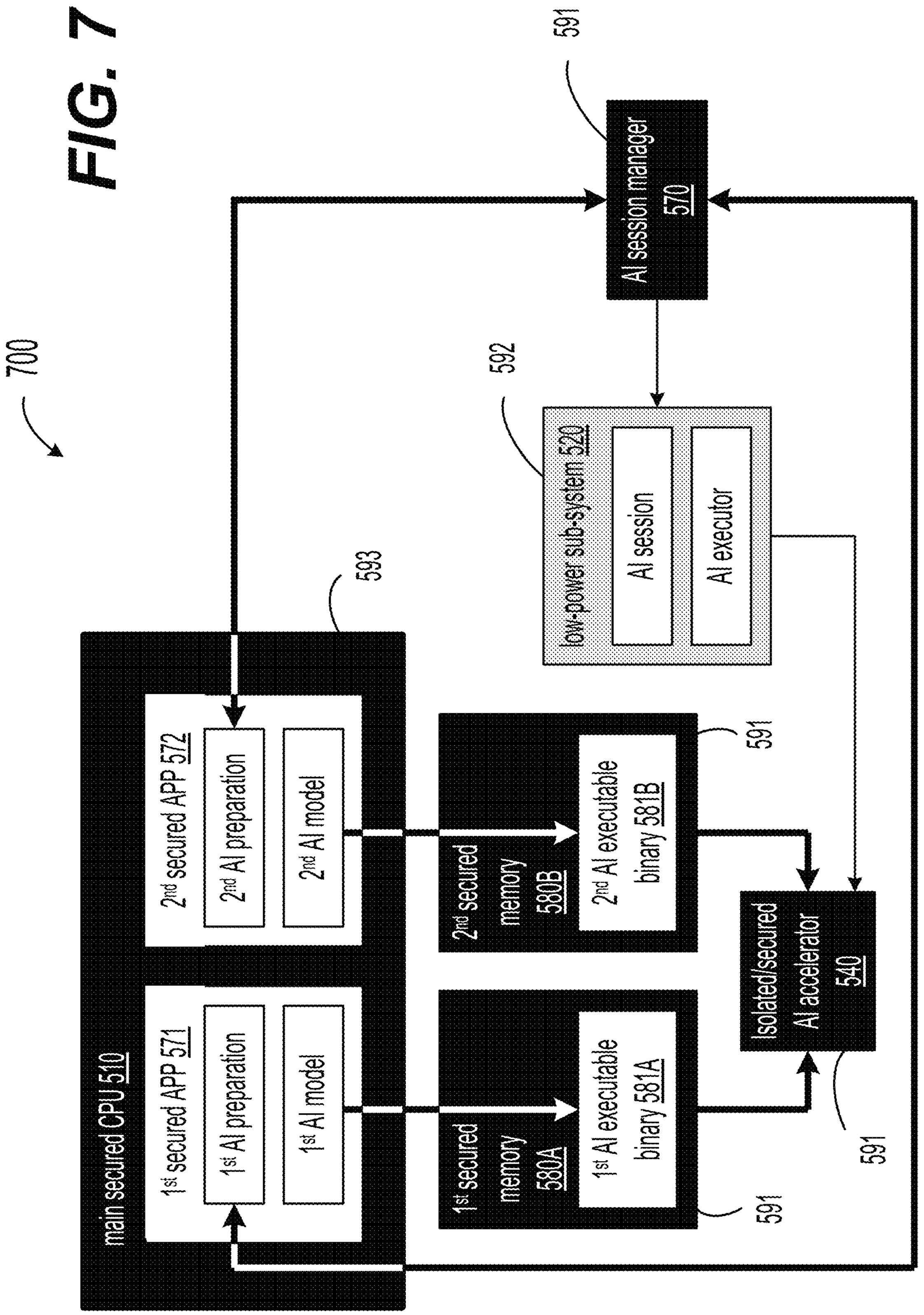
FIG. 7 is a functional block diagram of a fifth AmI-enabled apparatus according to some embodiments of the present disclosure.

FIG. 7 is a functional block diagram of an AmI-enabled apparatus 700, e.g., a mobile phone, according to some embodiments of the present disclosure. The apparatus 700 can be similar to the apparatus 500 except the location of the AI session manager 570 and the omission of the secure OS 560. In the example embodiment of the apparatus 700 shown in FIG. 7, the AI session manager 570 is independent from the main secured CPU 510 and the secured APU 540.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. An apparatus, comprising:

a first secured processor; two and more secured applications embedded in the first secured processor, each of the secured applications associated with an artificial intelligence (AI) model; two and more first secured memories coupled to the first secured processor, each of the first secured memories configured to store an AI executable binary that is associated with a corresponding one of the AI models;

a second secured processor coupled to the first secured memories, the second secured processor configured to execute the AI executable binaries stored in the first secured memories;

a sub-system coupled to the second secured processor; and an AI session manager coupled to the sub-system and the secured applications, the AI session manager configured to receive from the sub-system an AI session that identifies one of the AI models, and prepare and store an AI executable binary associated with the AI model to one of the first secured memories that corresponds to the AI executable binary, wherein the sub-system triggers the second secured processor to execute the AI executable binary stored in the first secured memory;

wherein the AI model is protected by a trusted execution environment (TEE); and the first secured memories, the second secured processor, and the sub-system are simultaneously protected by multiple firewalls;

wherein a secure operating system (OS) is embedded in the first secured processor, and the secure OS is configured to provide the TEE within which the secured applications are protected;

wherein the first secured memories and the second secured processor are protected by a first firewall, for protecting the AI executable binary from being attacked;

wherein the sub-system is protected by a second firewall, for protecting the AI session from being attacked;

wherein the first firewall provides a higher security level than the second firewall.

2. The apparatus of claim 1, wherein the AI session manager is embedded in the first secured processor and protected within the TEE.

3. The apparatus of claim 1, further comprising: a second memory coupled to the second secured processor, the second memory configured to store data on which the second secured processor executes the AI executable binary.

4. The apparatus of claim 3, further comprising: an image signal processor (ISP) coupled to the second memory, the ISP configured to process images and store the processed images into the second memory, and a facial biometric pattern secured within the TEE, wherein the second secured processor executes the AI executable binary to determine whether any one of the processed images matches the facial biometric pattern.

5. The apparatus of claim 1, wherein the AI session manager is embedded in the second secured processor.

6. The apparatus of claim 1, wherein the AI session manager is protected by the first firewall.

7. The apparatus of claim 1, wherein the sub-system includes a sensor hub.

8. The apparatus of claim 1, wherein the first secured processor includes a secured central processing unit (CPU).

9. The apparatus of claim 1, wherein the second secured processor includes a secured deep learning accelerator (DLA).

10. The apparatus of claim 9, wherein the DLA includes an accelerated processing unit (APU).

* * * * *